Nov. 24, 1953 V. O. HAUSWIRTH 2,660,445
FRAME CONSTRUCTION FOR IMPLEMENT DRAFT DEVICES
Filed June 29, 1949 2 Sheets-Sheet 1
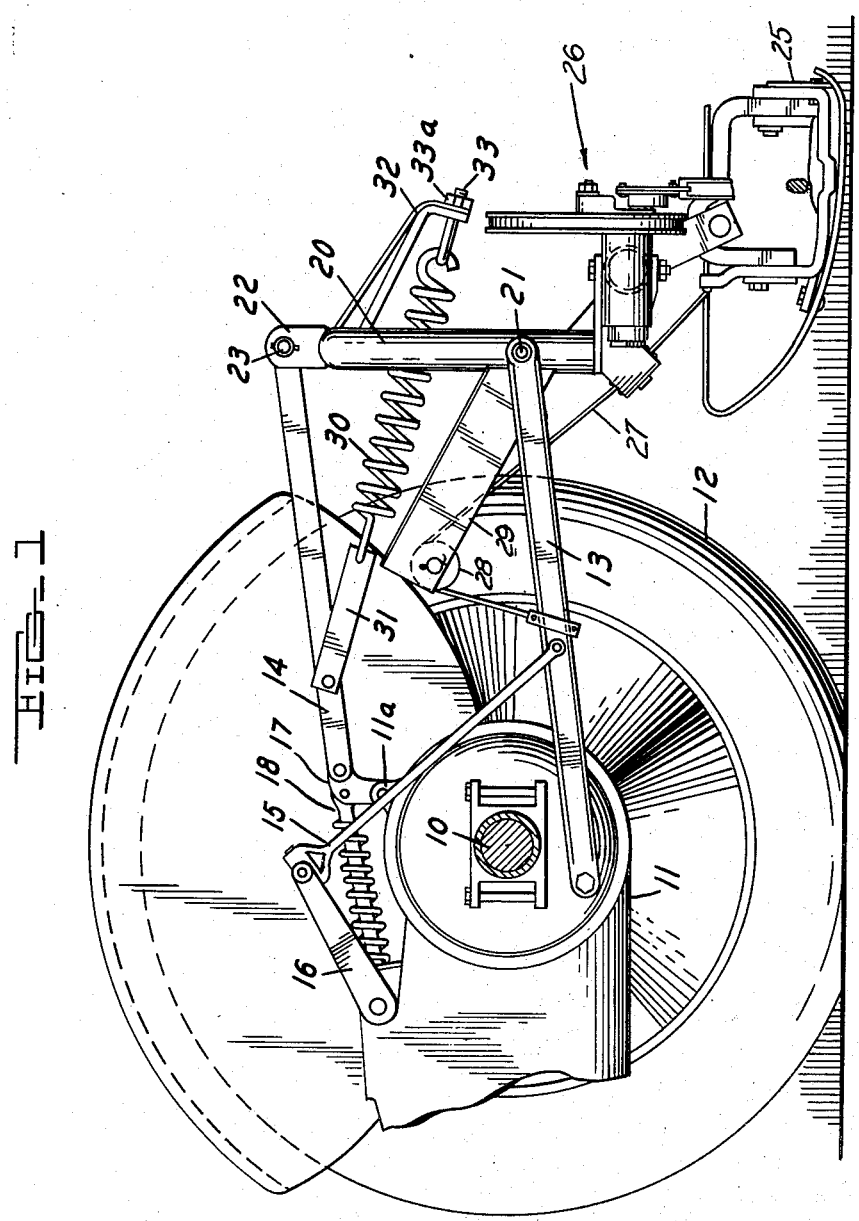
INVENTOR.
Vernon O. Hauswirth
BY
ATTORNEY

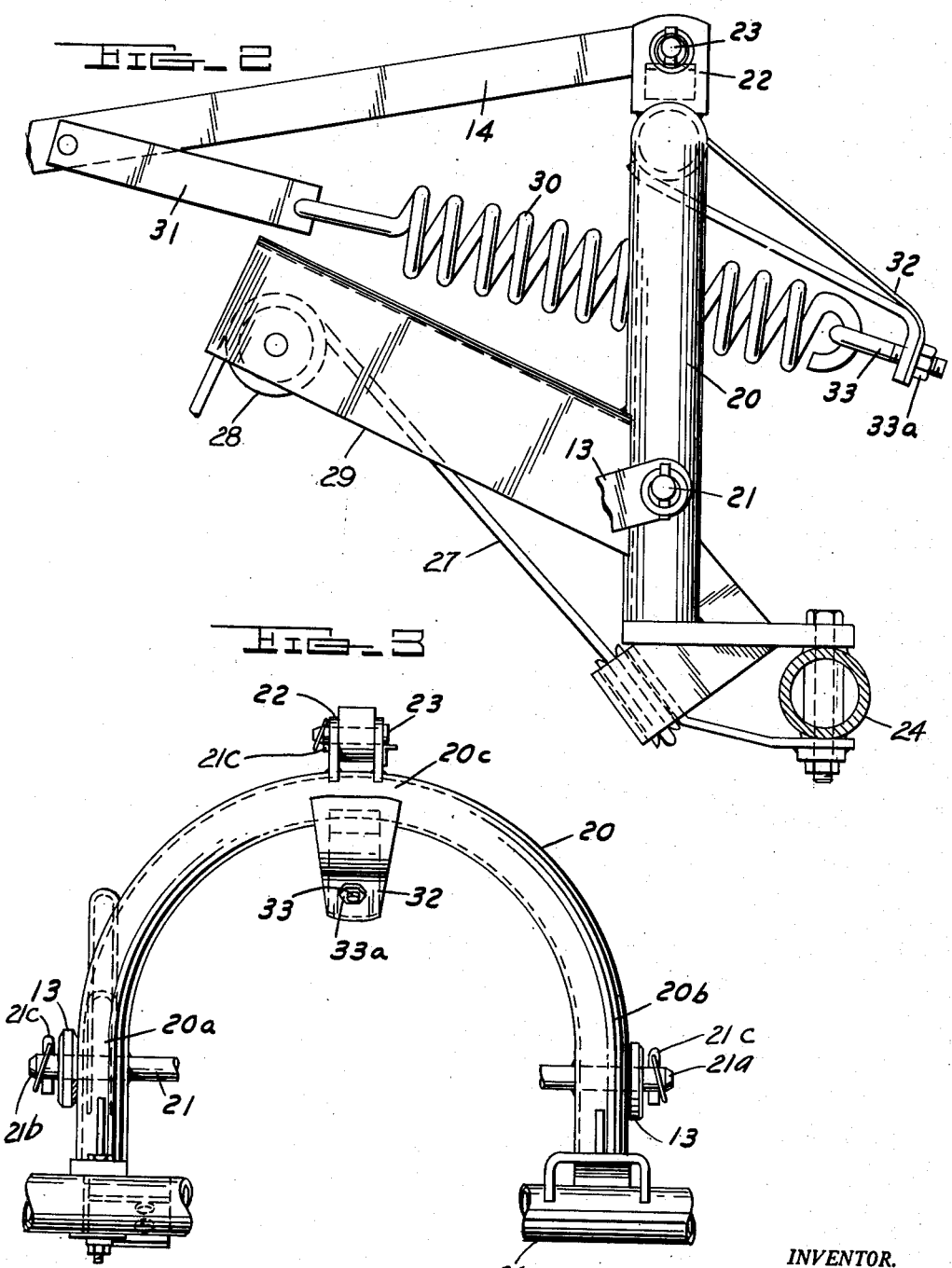

Patented Nov. 24, 1953

2,660,445

UNITED STATES PATENT OFFICE 2,660,445

FRAME CONSTRUCTION FOR IMPLEMENT DRAFT DEVICES

Vernon O. Hauswirth, Los Gatos, Calif., assignor to Dearborn Motors Corporation, Highland Park, Mich., a corporation of Delaware Application June 29, 1949, Serial No. 102,058

1 Claim. (Cl. 280—33.44)

This invention relates to an improved frame construction for tractor-carried implements and has particular utility as applied to implements for use with a tractor having a well known hydraulically controlled, three point hitch linkage for connection of implements thereto.

In a copending application of Clarence B. Richey, Serial No. 85,214, filed April 2, 1949, and assigned to the assignee of this invention, there is described and claimed an improved mower construction. This invention particularly relates to a more simplified frame structure for a mower of the type disclosed in the Richey application, but it should be distinctly understood that the frame construction of this invention may be readily applied to any type of tractor-carried implement.

In accordance with this invention, the carrying frame for a tractor-carried implement is formed from a unitary member bent into a generally U-shaped configuration. In the most economical form, the U-shaped implement may be conveniently fabricated from a single piece of tubing. A unitary rod is then passed through both arms of the U-shaped element adjacent the free ends, and the projecting ends of such rod are utilized as pivot bearings to mount the implement frame to the two lower links of a well-known hydraulically controlled, three link tractor hitch. Means are then provided on the bight portion of the U-shaped frame element for connecting the third link thereto.

The main frame structure of the implement is then suitably attached to the free ends of the U-shaped frame element. In this manner, an unusually simple and economical carrying frame is provided which is nevertheless sufficiently strong and rigid to provide reliable service under the adverse conditions generally encountered in the use of an agricultural implement.

Still another feature of this invention is the mounting of a spring between the U-shaped frame element and one of the supporting links of the tractor in such manner that as the frame and links are lowered toward a ground engaging position, the spring will be stressed and thereby a predetermined portion of the weight of the implement carried by the U-shaped element will be supported by the spring. This feature is of particular utility as applied to mowers and like implements.

Accordingly, it is an object of this invention to provide an unusually simple and economically manufacturable frame structure for a tractor-carried implement.

A further object of this invention is to provide an improved carrying frame for implements to be used with tractors having a three point hitch linkage for connecting implements thereto.

The specific nature of this invention, as well as other objects and advantages thereof, will become apparent to those skilled in the art from the following detailed description taken in conjunction with the annexed sheets of drawings which, by way of preferred example only, illustrate one embodiment of the invention.

On the drawings:

Figure 1 is a side elevational view of the rear portion of a tractor (with one wheel removed for clarity of illustration) showing an implement connected thereto embodying a frame structure in accordance with this invention.

Figure 2 is an enlarged scale side elevational view of the carrying frame portion of the implement shown in Figure 1.

Figure 3 is an enlarged rear end elevational view of the carrying frame portion of the implement shown in Figure 1.

As shown on the drawings:

The rear portions of a tractor of well known construction is illustrated and such tractor embodies a rear axle casing 11 in which is suitably journaled an axle 10 which in turn mounts a pair of rear wheels 12. To connect various agricultural and industrial implements to such tractor, a three point connection linkage is provided, consisting of a pair of transversely spaced lower links 13 and an upper link 14. Each of the lower links 13 is pivotally secured at its forward end to its axle casing 11 and may be raised or lowered by a lifting link 15. The lifting links 15 are concurrently raised by hydraulically-controlled rocker arms 16. In the center of rear axle casing 11, and at a point above the connection of the lower links 13, a bracket 11a is provided to which is pivoted a connecting link 17. The forward end of the top link 14 is pivoted to connecting link 17 as is also the rearward end of a compressible control member 18. Control member 18 is suitably interconnected with the hydraulic ram (not shown) which actuates the rocker arms 16 so as to effect a control action on such ram in response to the exertion of a compressive force upon control member 18. All of the construction thus far described will be recognized as being entirely conventional and well known, and hence a more detailed description is deemed unnecessary.

In accordance with this invention, an implement-carrying frame 20 is provided which comprises a single frame element bent into a generally U-shaped configuration. In the particular embodiment illustrated, the carrying frame 20 is conveniently formed from a unitary length of tubing. A rod 21 is passed through suitable apertures in both arm portions 20a and 20b of frame 20 and is rigidly secured to frame 20 in any convenient manner, such as by welding. The end portions 21a and 21b of the rod 21 respectively project beyond the arm portions 20a and 20b of frame 20 and are suitably shaped so as to provide pivot bearing surfaces to which the lower links 13 of the three-point tractor linkage may be connected. Links 13 are retained on rod ends 21a and 21b by lynch pins 21c in conventional fashion.

In the center of the bight portion 20c of frame 20, a pair of spaced ears 22 are suitably mounted, such as by welding, and the ears 22 apertured to receive a pin 23 by which the top link 14 may be pivotally secured to the frame 20. When thus connected to the links 13 and 14 of the tractor, it is apparent that the position of frame element 20 is completely determined by the vertical position of the tractor link 13 and that the frame 20 may be conveniently raised or lowered with respect to the ground by actuation of the hydraulic lifting control mechanism conventionally provided on the tractor 5.

The main frame portion of implement may then be mounted in any convenient manner to the free ends of the tubular frame element 20. In the specific embodiment illustrated in the drawing, a mower support bar 24 is mounted to the free ends of the frame element 20 and such bar in turn supports a cutter bar unit 25 and a driving mechanism 26 for such cutter bar unit. The construction of the mower support bar 24 and the associated mower mechanism forms no part of this invention and preferably partakes of the construction described and illustrated in the aforementioned application of C. B. Richey. So far as this invention is concerned, it is sufficient to note the fact that the implement frame is supported from the free ends of the tubular frame element 20.

As is more specifically described in the aforementioned copending Richey application, the lifting of the outer end of the cutter bar unit 25 is accomplished through a cable 27 which is trained on a pulley 28 supported in a U-shaped bracket 29 which in turn is welded to the arms 20a of the tubular element 20 in forwardly and upwardly projecting relationship.

In the event that it is desired to resiliently support whatever implement is mounted on the tubular frame element 20 so that such implement will bear against the ground with only sufficient force to insure that it will follow the ground contour, such counterbalancing may be effected by the stressing of a spring by the downward movement of the hitch links 13 and 14 and the frame element 20. With the described frame construction, such spring 30 may be conveniently mounted between a spring anchor 31 pivotally attached to the forward portion of the top link 14 and a rearwardly and downwardly projecting bracket 32 which is suitably secured, as by welding, to the bight portion 20c of the tubular frame element 20. The spring 30 may be adjustably anchored to the bracket 32 by an eye bolt 33 and nut 33a.

Such mounting of the spring 30 will produce an increased stressing of the spring as the hitch links 13 and 14 and frame element 20 are lowered towards the ground. However, the effective lever arm of the spring 30 resisting the downward movement of the hitch links 13 and 14 and the connected implement decreases somewhat as the hitch links are lowered toward the ground so that a substantially uniform counterbalancing suspension of the implement is produced. This feature provides a substantially uniform downward force operating on the implement to hold it in engagement with the ground so that it will accurately follow the ground irregardless of the irregularities in the ground contour.

From the foregoing description, it is apparent that this invention provides an unusually simple and economically manufacturable implement-carrying frame for use with tractors having the three link type of implement hitch. Notwithstanding the simplicity of the carrying frame, it is nevertheless of unusual rigidity and sturdiness and will provide reliable service under the most adverse conditions of use.

I claim:

An implement carrying frame for use with a tractor having a pair of lower laterally spaced power liftable trailing hitch links and a trailing upper hitch link, said hitch links being pivotally connected thereto and having their free trailing ends triangularly disposed in a vertical plane, said frame comprising a unitary piece of tubing deformed into a rigid inverted U-shaped configuration having generally parallel dependent arm portions and an upper curved bight portion joining said arm portions, a single rod passing through and fixedly secured to each of said arm portions intermediate the vertical length thereof to extend laterally therebetween to rigidify the frame and projecting laterally therebeyond to define pivot bearings for respective connection to the trailing ends of said lower two tractor hitch links, a pair of laterally spaced ears defining a bracket projecting vertically above said frame bight portion and located generally centrally thereof to provide means for connection of the trailing end of the upper hitch link to said frame, and an implement-attaching bracket rigidly secured to each of the free lower extreme ends of said tubing arm portions.

VERNON O. HAUSWIRTH.

References Cited in the file of this patent

UNITED STATES PATENTS

| Number | Name | Date |
|---|---|---|
| 1,111,757 | Nilson | Sept. 29, 1914 |
| 1,501,652 | Ferguson | July 15, 1924 |
| 1,865,786 | Paul | July 5, 1932 |
| 2,052,294 | Hilblom | Aug. 25, 1936 |
| 2,329,881 | Clapper | Sept. 21, 1943 |
| 2,341,807 | Olmstead et al. | Feb. 15, 1944 |
| 2,354,710 | Simpson et al. | Aug. 1, 1944 |
| 2,396,576 | Kelly | Mar. 12, 1946 |
| 2,438,553 | Fraga | Mar. 30, 1948 |
| 2,465,641 | Gardner | Mar. 29, 1949 |
| 2,531,768 | Cline et al. | Nov. 28, 1950 |
| 2,550,412 | Girardi | Apr. 24, 1951 |

FOREIGN PATENTS

| Number | Country | Date |
|---|---|---|
| 553,835 | Great Britain | June 8, 1943 |